PIEZO-ELECTRIC MODULATION OF LASERS

Filed Aug. 21, 1963

INVENTOR
Dennis Howling
BY Eli Weiss
ATTORNEY

United States Patent Office 3,354,407
Patented Nov. 21, 1967

3,354,407

PIEZO-ELECTRIC MODULATION OF LASERS

Dennis Howard Howling, Wayland, Mass., assignor to American Standard Inc., a corporation of Delaware Filed Aug. 21, 1963, Ser. No. 303,589
3 Claims. (Cl. 331—94.5)

ABSTRACT OF THE DISCLOSURE

There is disclosed apparatus for modulating a laser light beam. The apparatus includes a laser rod whose length is changed to obtain the desired modulation. The length can be changed by applying a varying magnetic field to a laser rod which includes magnetostrictive material. The length can also be changed by applying a varying electric field to a rod which includes piezo-electric material. In accordance with the second-mentioned embodiment the reflective end surfaces of the rod act as conductive plates which receive the modulating signal to establish the varying electric field.

The present invention relates to improvements in lasers and more particularly to a method and mechanism for modulating a laser beam.

As is now well know, lasers operate by exciting the ions in a laser element, which may be a solid crystal or a gas laser unit, to raise them from their normal energy level to a higher energy level. The excited or stimulated ions tend to drop back toward their original energy level and in doing so radiate photons. The photons in turn stimulate other ions in the laser element to cause them to radiate additional photons. The photons are caused to undergo feedback (in a rod laser by reflection between silvered ends) to give the proper amplification and a laser beam which is virtually monochromatic is emitted from the laser element.

One form of laser element in common use today is a straight rod made of a ruby crystal or some similar material. Both ends of the rod are silvered to permit feedback or internal reflection of the photons and one end is slightly transparent to permit the laser beam to be emitted from the rod. In such a ruby rod laser, the excitation source in the form of pumped light, will stimulate the chromium ions in the ruby crystal to raise them to a higher energy level. When the chromium ions tend to drop back toward their original energy level, photons are radiated.

It has been found that a laser beam cannot be easily modulated so that the use of lasers in communications and related fields has thus far been limited.

The present invention has for one of its objects the provision of improved method and mechanism for modulating a laser beam.

Another object of the present invention is the provision of an improved laser element which will cause a modulated laser beam to be emitted therefrom.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

For ease in description the invention will be described in connection with a laser comprising a rod laser element made of a ruby crystal. However, it will be understood that the present invention may be used with lasers utilizing a laser element made of any suitable laser material and may also be used with gas lasers.

Furthermore it will be understood that the present invention may also be used with a so-called maser and that wherever the term "laser" appears herein, it is understood that the term is also intended to include a maser.

Figure 1:
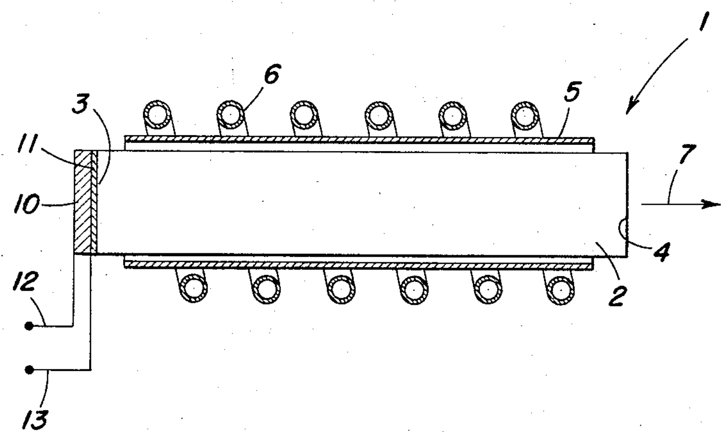
FIG. 1 is a schematic view of a laser embodying the present invention.

Referring more particularly to FIG. 1 the laser 1 comprises a laser element 2 which in the drawing is shown as a rod made of the usual ruby crystal. The ends 3 and 4 of the rod 2 are straight and substantially parallel to each other and both are silvered to permit internal reflection of the photons. The front end 4 is slightly transparent to permit a laser beam 7 to be emitted therefrom.

The laser rod 2 is encased in the usual damping tube 5 and is provided with a suitable light source 6, which may be the usual xenon flash lamp, which pumps light into the laser element 2 to excite the ions in the laser element 2. As pointed out above, the excited ions are raised to an energy level higher than the normal energy level and when they tend to return toward the original energy level, a photon will be radiated. The photons are internally reflected between the silvered ends 3 and 4 of the rod 2 until a laser beam 7 emerges from the slightly transparent end 4 of the rod 2.

In order to modulate the laser beam 7, the length of the laser rod 2 is changed, i.e. the length of the laser rod 2 is varied. Since the frequency or wave length of the laser beam 7 is a function of the length of the laser rod 2, a change in the length of the laser rod 2 will cause a corresponding change in the frequency of the laser beam 7 so that the laser beam 7 will be modulated.

The three embodiments shown in the drawings illustrate means which may be used for changing the length of the rod 2. However, it will be understood that it is within the scope of the present invention to utilize any mechanism for changing the length of the rod 2 and thereby causing the modulation of the laser beam 7.

In the embodiment shown in FIG. 1, a piezo-electric element 10 is adhered to the higher reflective end 3 of the rod 2 by any suitable means such as optical adhesive 11. The piezo-electric element 10 is connected to a source of power by leads 12 and 13 and may be made of any suitable piezo-electric material, such as quartz, and may be either single crystal or poly-crystal, as may be desired.

When an exciting voltage is applied across the piezo-electric element 10, through leads 12 and 13, the piezo-electric element 10 will vibrate, or change its size, with a predetermined frequency. The vibrations of the piezo-electric element 10 will, in turn, cause a corresponding vibration or change in the length of the laser rod 2. The frequency of the vibration or change in length of the laser rod 2 will be tuned to the frequency of vibration of the piezo-electric element 10. This vibration or change in the length of the laser rod 2 will vary or change in the total path that the photons travel within the element 2 and thus cause a frequency modulation in the laser beam 7.

It has also been found that variation of the length of the rod 2 will also produce a modulation of the energy stored within the rod 2 so that amplitude modulation of the laser beam 7 also results.

Figure 2:
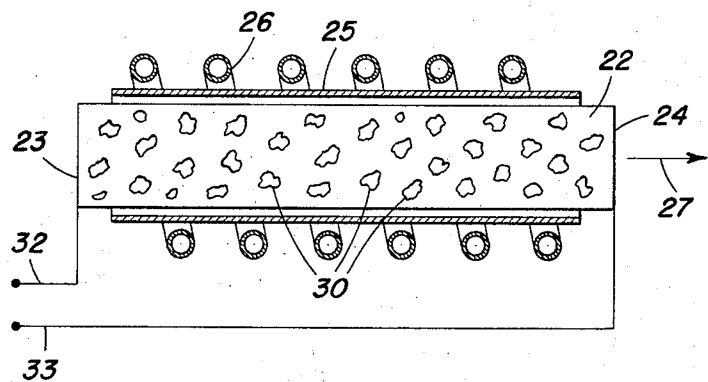
FIG. 2 is a schematic view of a laser embodying a modification of the present invention.

Another embodiment of the present invention is shown in FIG. 2. Similar to the embodiment shown in FIG. 1, the laser rod 22 has both ends 23 and 24 silvered, with end 24 slightly transparent, and is provided with a damping tube 25 and the usual light source 26. In this embodiment, however, piezo-electric material 30 is dispersed in the laser rod 22. The ends 23 and 24 of the rod 22 are connected to a power source by leads 32 and 33, respectively, so that when power is applied across the rod 22, the piezoelectric material 30 vibrates to cause a change in the length of the rod 22. Hence modulation of the laser beam 27 occurs in a manner similar to the embodiment shown in FIG. 1.

Figure 3:
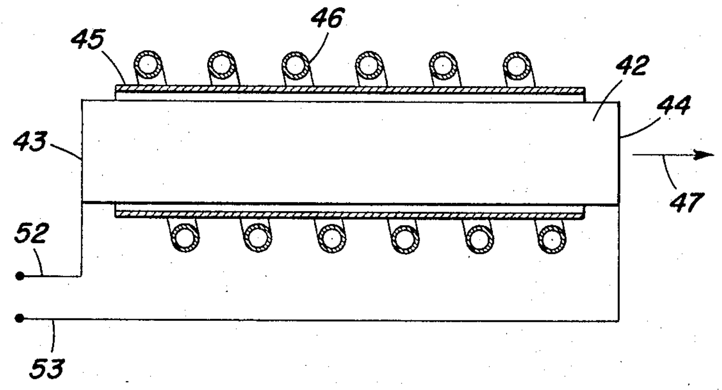
FIG. 3 is a schematic view of a laser embodying another modification of the present invention.

Alternately, and referring particularly to the embodiment shown in FIG. 3, the rod 42 may be made of a piezo-electric material, such as quartz or some other similar material, with laser material (not shown) imbedded therewithin. Here also, the rod 42 has silvered ends 43 and 44 which are connected to a source of power by leads 52 and 53, respectively, and has a damping tube 45 and a light source 46. When a voltage is applied across the silvered ends 43 and 44, the variations in the length of the rod 42 will produce modulation of the laser beam 47.

It will thus be seen that the present invention provides a method and mechanism for modulating laser beams and an improved laser element which will cause a modulated laser beam to be emitted therefrom.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A laser modulation system comprising a rod consisting of a mixture of negative temperature material and a piezo-electric material, said rod having substantially flat and parallel end faces, a metallic and substantially totally reflective surface connected to one of said end faces, a metallic and partially reflective and partially transmissive surface member connected to the other of said end faces, said surface members forming a resonant cavity for said rod and being affixed to said rod and movable therewith, a first signal lead connected to one of said reflective surface members, a second signal lead connected to the other of said reflective surface members, said signal leads being adapted to receive a varying electrical signal for exciting the piezoelectric material to vary the length of said rod, a pumping means for exciting said negative temperature material whereby said surface members simultaneously act as electrodes for an electric field and as reflectors for a resonant cavity.

2. The system of claim 1 wherein said rod comprises a matrix of negative temperature material and a piezo-electric material embedded in said matrix.

3. The system of claim 1 wherein said rod comprises a matrix of piezo-electric material and a negative temperature material embedded in said matrix.

References Cited

UNITED STATES PATENTS 2,960,914 11/1960 Rogers ............ 350—150
3,166,673 1/1965 Vickery et al. .... 331—94.5 X
3,243,722 3/1966 Billings ............ 331—94.5

OTHER REFERENCES

F. S. Barnes, "On the Modulation of Optical Masers," Proceedings of the IRE, vol. 50 (July 1962), pp. 1686, 1687.

JEWELL H. PEDERSEN, *Primary Examiner.*

W. L. SIKES, *Assistant Examiner.*